P. B. MARCUS & E. R. BÖHME.
ELASTIC WHEEL.
APPLICATION FILED FEB. 25, 1914.

1,139,429.

Patented May 11, 1915.
2 SHEETS—SHEET 1.

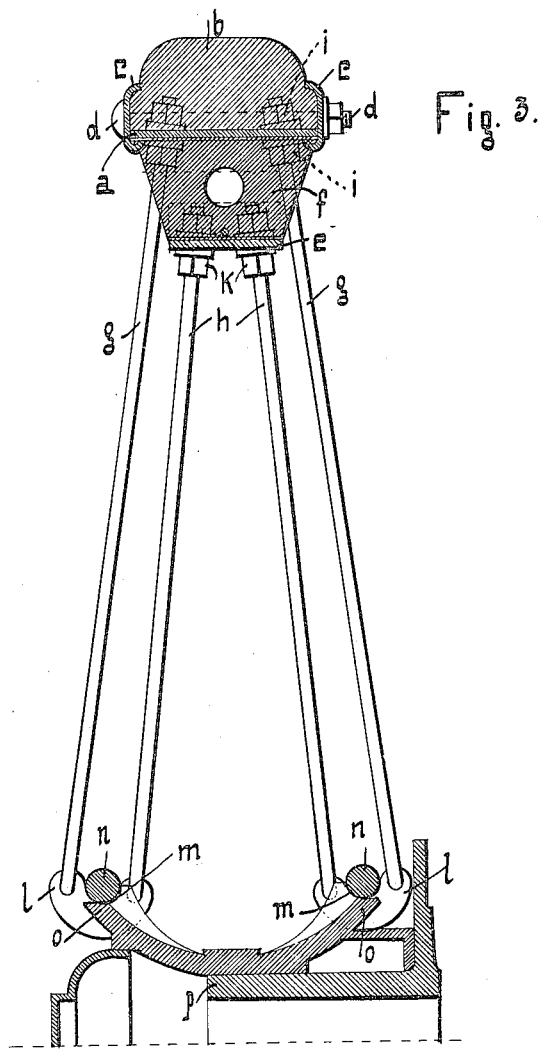

UNITED STATES PATENT OFFICE.

PAUL BERNHARD MARCUS, OF NEU-ROCHWITZ, NEAR DRESDEN, AND EUGEN RICHARD BÖHME, OF DRESDEN, GERMANY.

ELASTIC WHEEL.

1,139,429. Specification of Letters Patent. Patented May 11, 1915.

Application filed February 25, 1914. Serial No. 820,958.

*To all whom it may concern:*

Be it known that we, PAUL BERNHARD MARCUS, a citizen of the Kingdom of Saxony, German Empire, residing in Neu-Rochwitz, near Dresden, in the Kingdom of Saxony, in said Empire, and EUGEN RICHARD BÖHME, a citizen of the Kingdom of Saxony, German Empire, residing in Dresden-A., in the Kingdom of Saxony, in said Empire, have invented certain new and useful Improvements in Elastic Wheels, of which the following is a specification.

According to the present invention, which relates to an elastic wheel, in particular for automobiles, a second rim is concentrically provided within the wheel rim the two rims being connected with each other by means of spoke systems which are symmetrically arranged with regard to a plane laid vertically through the middle of the wheel. Each spoke system consists of two spokes. The outer spoke extends from the rim to the hub, the inner spoke from the hub to the inner rim. The lower ends of these two spokes are hinged to a rocking member. Thereby it is obtained, that shocks striking the wheel rim are transmitted by these spoke systems to the inner rim, whereby these shocks are absorbed by the tension energy, so that the shocks are transmitted either not at all or to a very diminished extent to the hub or the body of the vehicle. As the connection between the spokes by means of these rocking members is extremely sensitive, and as always two symmetrical spoke systems, as regards the vertical plane through the middle of the wheel, coact, also forces which act on one side only will be absorbed.

A constructional form of the present invention is shown in the accompanying drawing.

Figure 1:
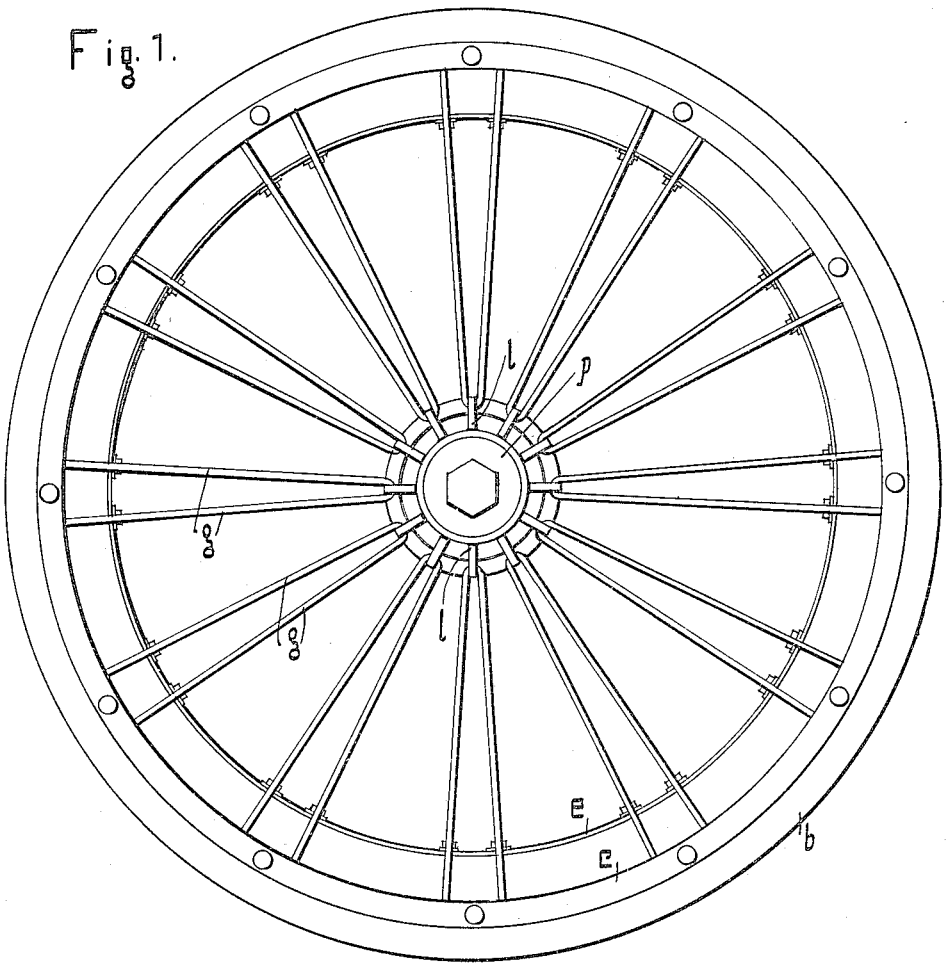
Figure 2:
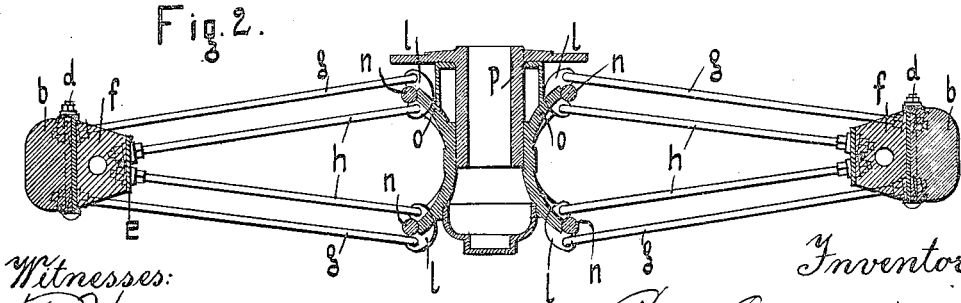

Figure 1 is a side elevation. Fig. 2 is a horizontal section, and Fig. 3 is the horizontal section on an enlarged scale.

The wheel rim is indicated by the letter *a*. On it is fitted a solid rubber tire *b* by means of detachable flanges *c*, which engage under the rim *a* and are held together by means of screw bolts *d*. Within the rim *a* a second rim *e* is concentrically arranged. In the constructional form shown the intervening space between the two rims *a* and *e* is filled by an elastic solid rubber ring *f*. This arrangement is preferable, but not absolutely necessary.

For connecting the two rims with each other and with the hub two systems of spokes are provided, which are symmetrically arranged to a plane laid vertically through the middle of the wheel. Each spoke system consists of an outer spoke *g* of an essentially U-shape and of an inner spoke *h* likewise of an essentially U-shape. The ends of the legs of these spokes are secured by means of screws *i* and *k* respectively to the rims *a* and *e*. At their apices these spokes are secured to rocking members *l*. These rocking members act as double-armed levers, bearing with correspondingly shaped recesses *m* from inside against a ring *n*. The ring *n* is supported on an extension *o* of the wheel hub *p*. When shocks occur, the rocking members *l* commence to play, by the compression strains transmitted to the spokes *g* being transferred by means of the rocking members *l* to the corresponding spokes *h*, so that the inner rim *e* is put under tension. Thereby such shocks are compensated, by the corresponding opposite spokes being submitted to a tensile strain and the strain being distributed over all sets of spokes, without the hub suffering at all or to any considerable extent.

We claim:

1. An elastic wheel comprising two concentrically arranged and spaced rims, the said rims being connected with each other by means of two spoke systems symmetrically arranged to a vertical plane through the middle of the wheel, said spoke systems comprising each a spoke extending from the outer rim toward the hub and a spoke extending from the inner rim toward the hub, and a double-armed lever, to which the hub-ends of said spokes are hinged.

2. An elastic wheel, comprising two concentrically arranged and spaced rims, the said rims being connected with each other by means of two spoke systems symmetrically arranged to a vertical plane through the middle of the wheel, said spoke systems comprising each a spoke extending from the outer rim toward the hub and a spoke extending from the inner rim toward the hub, and a double-armed lever in form of a rocking member, to which the hub-ends of said spokes are hinged, said rocking member bearing on and supported by a ring fitted around the hub and supported by extensions thereof, said ring adapted to act as abutment and fulcrum for said rocking members.

3. An elastic wheel, comprising two concentrically arranged and spaced rims, the said rims being connected with each other by means of two spoke systems symmetrically arranged to a vertical plane through the middle of the wheel, said spoke systems comprising each a spoke extending from the outer rim toward the hub and a spoke extending from the inner rim toward the hub, and a double-armed lever, to which the hub-ends of said spokes are hinged, the space intervening between the said outer rim and the said inner rim filled by an elastic ring.

In testimony that we claim the foregoing as our invention, we have signed our names in presence of two subscribing witnesses.

PAUL BERNHARD MARCUS.
EUGEN RICHARD BÖHME.

Witnesses:
OTTO WOLFF
GUSTAV MÜLLER.

Copies of this patent may be obtained for five cents each, by addressing the "Commissioner of Patents. Washington, D. C."